June 15, 1926.
E. J. WELFFENS
1,588,865
DRIVING OF DRAWING ROLLERS IN SPINNING MACHINERY
Filed June 6, 1925
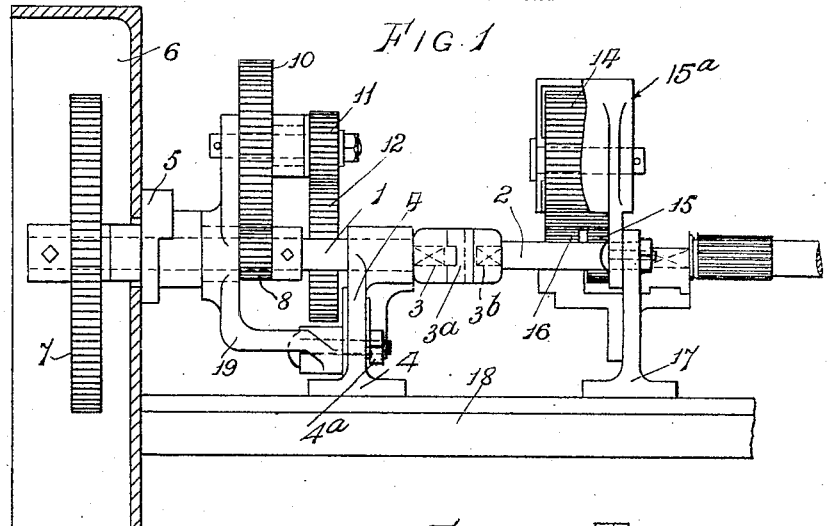
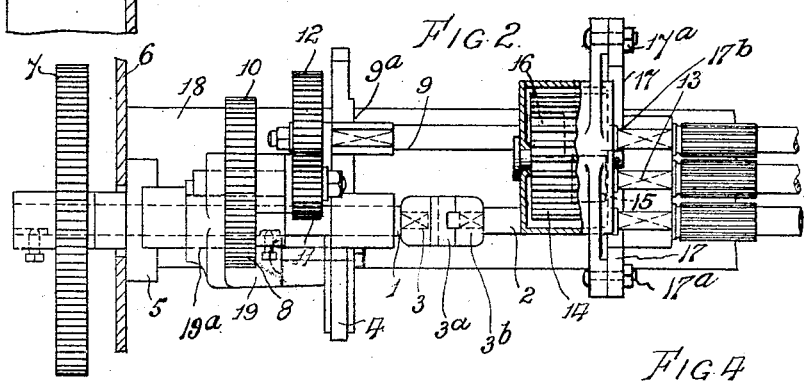
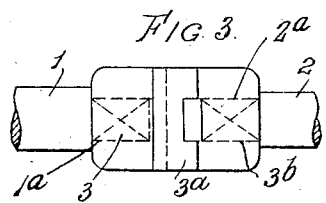
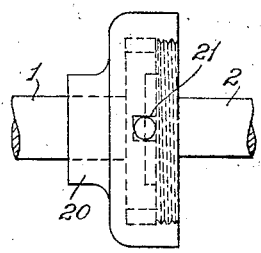
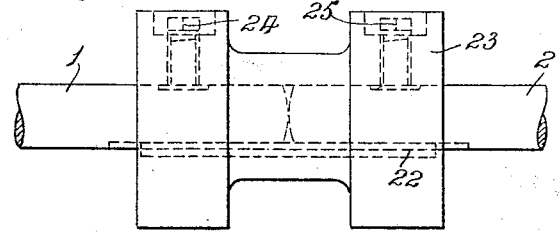
INVENTOR:
Emile John Welffens
BY: Ruege, Bayer & Bakelaw
ATTORNEYS.

Patented June 15, 1926.

1,588,865

UNITED STATES PATENT OFFICE.

EMILE JOHN WELFFENS, OF MANCHESTER, ENGLAND.

DRIVING OF DRAWING ROLLERS IN SPINNING MACHINERY.

Application filed June 6, 1925, Serial No. 35,306, and in Great Britain June 4, 1924.

The invention concerns the drawing rollers used in spinning machinery, and aims at providing means for facilitating and accelerating their scouring or cleaning.

For scouring the rollers are generally withdrawn from their bearings. In machinery as used and made at present, the the front roller can only be withdrawn after removing covers, wheels, and bearings, because the driving end of such rollers is integral with the rollers, because the driving end extends into the gearing end of the machine and because the driving end generally carries the wheels from which all the rollers derive their motion.

Displacing one or more gear wheels allows the withdrawal of the other rollers.

In carrying the invention into effect, I separate the driving end of the front roller or its equivalent from the roller and I provide a suitable coupling whereby driving end and roller may be connected or disconnected at will. Preferably I also provide an additional bearing for the separate driving end, because, by doing so I avoid the necessity of providing a coupling that will rigidly connect the driving end and the roller, and I am enabled to use an Oldham's coupling or any other suitable flexible coupling, to connect driving end and roller positively for rotation. Flexible couplings allow slight discrepancies in alignment and their use expedites scouring because they are more easily connected and disconnected than rigid ones.

The provision of a coupling allows the driving end to remain in position while the roller is removed and so avoids the removal of covers, wheels, and bearings as needed with constructions as used and made at present.

By way of example the invention is illustrated in the accompanying drawings, showing the roller arrangement on a speed frame.

Fig. 1 is a front elevation and

Fig. 2 is a top view, showing how the roller drive may be arranged.

Fig. 3 is an enlarged view of the Oldham's coupling as illustrated in Figs. 1 and 2:

Fig. 4 is a flange coupling showing how roller and driving end may be rigidly connected:

Fig. 5 is a muff coupling showing another manner of coupling roller and driving end in a rigid manner.

In Figs. 1 and 2 numeral 1 designates the driving end of the front roller, 2 is the front roller, 3, 3ª and 3ᵇ the components constituting the Oldham's coupling connecting 1 and 2 positively though flexibly for rotation; squared ends 1ª and 2ª on 1 and 2 fit into square holes in 3 and 3ᵇ, 3ª being the connecting piece. The additional bearing stand supporting 1 is designated by numeral 4, 5 is the usual bearing for 1 and is fixed to gearing housing 6, 7 being the gear wheel through which all the rollers derive their motion. Pinion 8 is fixed to 1, drives the back roller 9, supported in a bearing 9ª, fixed to 4, through gear wheels 10, 11 and 12, and the middle roller 13 through wheels 14, 15, and 16. The first roller stand 17 supports hood or carrier 15ª as shown and, like bearing stand 4, is fixed to the roller beam 18. Wheels 10 and 11 are carried by arm 19 which swivels on bearing 5 and is fixable to bearing stand 4, so that wheels 10 and 11 may be adjusted when changing the draft and so that these wheels, as well as hood or carrier 15ª, may be swung clear when withdrawing the rollers for scouring. With wheels 10, 11 and hood 15ª clear, rollers 2, 9, and 13 may be withdrawn for cleaning and replaced without disturbing any wheels or bearing on end 1 and consequently without taking down such cases or plates as cover them. The arm or bracket 19 is pivoted or swiveled on the bearing 5 at 19ª and it is secured in a fixed position to the bearing stand 4 by means of a bolt 4ª. The carrier or hood 15ª in which the gear wheel 14 is mounted is secured to the roller stand 17 by bolts 17ª. One of the bolts 17ª is removed and the other bolt is loosened when it is desired to swing the carrier or hood 15ª for displacing the gear wheel 14. The bearing 9ª of the bearing stand 4 and the bearings 17ᵇ of the roller stand 17 are open bearings so that when the gear wheels 10 and 11 and the gear wheel 14 are displaced by swinging the arm or bracket 19 and the hood or carrier 15ª the rollers 2, 9 and 13 may be removed. The roller 2 is of course uncoupled from the end driving section 1 prior to removing it. The open bearings 9ª and 17ᵇ are clearly illustrated in Fig. 2 of the drawing and when the gear wheels 10, 11 and 14 are in mesh and the bearing arm 19 and the hood or carrier 15ª are in their normal position and fixed respectively to the bearing stand 4 and the roller stand 17, the rollers are confined in the said open bearings 9ª and 17ᵇ.

Fig. 3 shows an example of the flexible though positive coupling which may be used when driving end 1 is properly supported and located. Numeral 1 is the driving end, 2 the roller, 3 3ᵃ and 3ᵇ the components constituting the coupling. It will be obvious that discrepancies in alignment will in no way influence the driving and working of the roller and that the arrangement allows of withdrawing and replacing the roller without any trouble.

In many constructions pinion 8 and wheel 10 are, like wheel 7, inside the gearing end 6, roller stand 17 is nearer to gearing end 6, and room for a bearing stand 4 might be more or less limited. In such cases I use a coupling capable of coupling end 1 and roller 2 in a rigid manner.

Figs. 4 and 5 show examples of such couplings. Fig. 4 shows a flange coupling, 1 is the driving end having a recessed flange at one extremity, 2 is the roller with a flange threaded at its periphery and a neck to fit the recess in the flange on 1, 20 is a nut threaded to screw on the flange of 2. When nut 20 is tightened the neck on 2 is drawn into the recess in 1, this aligns end 1 and roller 2 and couples them together in a rigid manner. The flange on 1 and the neck on 2 have a slot, both slots engaging key 21, the driving load being taken by that key.

Unscrewing nut 20 and the dropping of key 21 allows withdrawal of roller 2 without disturbing end 1. Fig. 5 shows a muff coupling, 1 is the driving end, 2 is the roller, 22 is a key fitting in a keyway in muff 23 as well as in 1 and 2, 24 and 25 are sunk screws engaging flats on 1 and 2. The muff 23 would be sufficiently long to keep 1 and 2 substantially aligned and by loosening set screws 24 and 25 the muff 23 might be moved right or left and roller 2 withdrawn without disturbing end 1.

It is understood that the drawings show only some of the many forms the arrangement and the couplings may take without departing outside the scope of the invention which covers constructions wherein the driving ends of the rollers are separate and connected to the rollers by means of any suitable couplings in order to facilitate and expedite scouring.

What I claim as my invention and desire to secure by Letters Patent is:—

1. Draw rollers for spinning machinery including a front roller having a separate driving end section, driving gearing connected with the end section, and a coupling detachably connecting the said front roller with the end section and permitting the front roller to be removed with removing the end section.

2. Draw rollers for spinning machinery including front and rear rollers, the front roller having a separate driving end section, driving gearing comprising gear wheels mounted on the end section and the rear roller, and a movably mounted gear wheel meshing with the said gear wheels and movable into and out of mesh with the same, and a coupling detachably connecting the said front roller with the end section and permitting the removal of the front roller without removing the said end section.

3. Drawing rollers for spinning machinery including front and rear rollers, the front roller having a separate driving end section, spaced bearings for the end section, driving gearing comprising gear wheels mounted on the end section and the rear rollers, and a displaceable gear wheel meshing with the said gear wheels, a bracket pivotally mounted on one of the said bearings and detachably secured to the other bearing and carrying the displaceable gear wheel, said bracket being adapted to swing the displaceable gear wheel into and out of mesh with the other gear wheels, and a coupling connecting the front end section with the front roller and permitting the latter to be removed without removing the end section.

4. The combination with front, back and intermediate rollers, the front roller being provided with a separate driving end having a coupling for connecting it to the front roller, a plurality of bearings for the said driving end, a bracket pivotally mounted on one of the bearings and rigidly secured to the other bearing, gears mounted on the front and back rollers, other gears mounted on the said bracket and arranged to swing into and out of mesh with the gears of the front and back rollers, and gearing for connecting the intermediate roller with the back roller.

5. The combination with front, back and intermediate rollers, the front roller being provided with a separate driving end having a coupling for connecting it to the front roller, a plurality of bearings for the said driving end, a bracket pivotally mounted on one of the bearings and rigidly secured to the other bearing, gears mounted on the front and back rollers, other gears mounted on the said bracket and arranged to swing into and out of mesh with the gears of the front and back rollers, gears mounted on the intermediate and back rollers, a movable gear meshing with the latter gears and a pivotally mounted member carrying the said movable gear and arranged to swing the same into and out of mesh.

In testimony whereof I have signed my name to this specification.

EMILE JOHN WELFFENS.